(12) United States Patent
Berdelle-Hilge

(10) Patent No.: US 7,347,313 B2
(45) Date of Patent: Mar. 25, 2008

(54) METHOD OF EQUALLY SPACING ITEMS IN ARTICLE HANDLING SYSTEMS

(75) Inventor: Peter Berdelle-Hilge, Constance (DE)

(73) Assignee: Siemens AG, München (DE)

( * ) Notice: Subject to any disclaimer, the term of this patent is extended or adjusted under 35 U.S.C. 154(b) by 101 days.

(21) Appl. No.: 11/087,505

(22) Filed: Mar. 24, 2005

(65) Prior Publication Data

US 2006/0213750 A1   Sep. 28, 2006

(51) Int. Cl.
*B65G 47/26*   (2006.01)

(52) U.S. Cl. .............................. 198/459.1; 198/468.9; 198/468.3

(58) Field of Classification Search ............. 198/459.1, 198/468.3, 468.9
See application file for complete search history.

(56) References Cited

U.S. PATENT DOCUMENTS

| | | | | |
|---|---|---|---|---|
| 3,601,243 A | * | 8/1971 | Gurgacz | 198/430 |
| 4,061,528 A | * | 12/1977 | Lingl | 156/561 |
| 4,423,807 A | * | 1/1984 | Muller | 198/419.1 |
| 5,273,152 A | * | 12/1993 | Brun | 198/468.3 |

* cited by examiner

*Primary Examiner*—Joe Dillon, Jr.

(57) ABSTRACT

To equally space items along a first path, a predetermined number of items is moved towards each other to minimize distances between the items, and a gear mechanism is engaged with each item. The gear mechanism includes crossed bars, wherein pairs of the bars are coupled at middle joints so that each pair of bars forms an X-shaped structure and opposite ends of an X-shaped structure are coupled at end joints to respective ends of neighboring X-shaped structures. The gear mechanism is activated so that the gear mechanism acts upon each item and moves each item along the first path a predetermined distance to equally space the items.

10 Claims, 6 Drawing Sheets

METHOD OF EQUALLY SPACING ITEMS IN ARTICLE HANDLING SYSTEMS

BACKGROUND OF THE INVENTION

The various embodiments described herein generally relate to positioning items. More particularly, the various embodiments relate to a method for equally spacing items within handling systems. The handling system may include applications in postal automation with the items to be spaced being mail containers and the like.

In various applications, for example, article handling systems, the throughput and the efficiency of article handling systems may be substantially improved if more than one article is handled simultaneously. For example, a stationary processing station may pick up several articles, at the same time, from a conveying system transporting the articles to the processing station. Some systems require that the articles are equally spaced from each other to enable simultaneous handling. In these systems, the conveying system may have platforms, slots or containers, which do not move with respect to each other and are equally spaced, to transport the articles. In other systems, the conveying system may have a plurality of transport devices that move independently from each other on a track system to and from the processing station. The transport devices may be individually controlled to provide for the required equal spacing of the article carrying platforms, slots or containers at the processing station. This, however, may be time consuming and requires more effort and, as such, slow down the handling process.

SUMMARY OF THE INVENTION

It is an objective of the present invention to improve the handling of items without individually controlling the transport devices at a processing station.

Accordingly, one aspect involves a method of equally spacing a predetermined number of items along a first path. The method moves the items towards each other to minimize distances between the items, and engages a gear mechanism with each item. The gear mechanism includes crossed bars, wherein pairs of the bars are coupled at middle joints so that each pair of bars forms an X-shaped structure and opposite ends of an X-shaped structure are coupled at end joints to respective ends of neighboring X-shaped structures. Further, the method activates the gear mechanism so that the gear mechanism acts upon each item and moves each item along the first path a predetermined distance to equally space the items.

Advantageously, the various embodiments described herein do not require an individual articulation of the items to equally space them. Instead, the gear mechanism acts as a single actuator that positions all items at the same time. In addition, the gear mechanism positions the items at various predetermined pitches. After use, the gear mechanism is completely removable from the items.

BRIEF DESCRIPTION OF THE SEVERAL VIEWS OF THE DRAWINGS

These and other aspects, advantages and novel features of the embodiments described herein will become apparent upon reading the following detailed description and upon reference to the accompanying drawings. In the drawings, same elements have the same reference numerals.

DETAILED DESCRIPTION OF CERTAIN INVENTIVE EMBODIMENTS

The certain inventive embodiments described hereinafter generally position items in a desired manner, for example, so that neighboring items are equally spaced. As used throughout the application items refer to devices, vehicles, articles, pieces, items or the like that are movable, for example, along a path. It is however contemplated that other items, as would be imagined by one skilled in the art, may be included in the definition of items. Further, it is contemplated that positioning such items may include positioning carriers or platforms that hold and/or carry these items. One exemplary application of these embodiments is in a system that handles such items.

Figure 1:
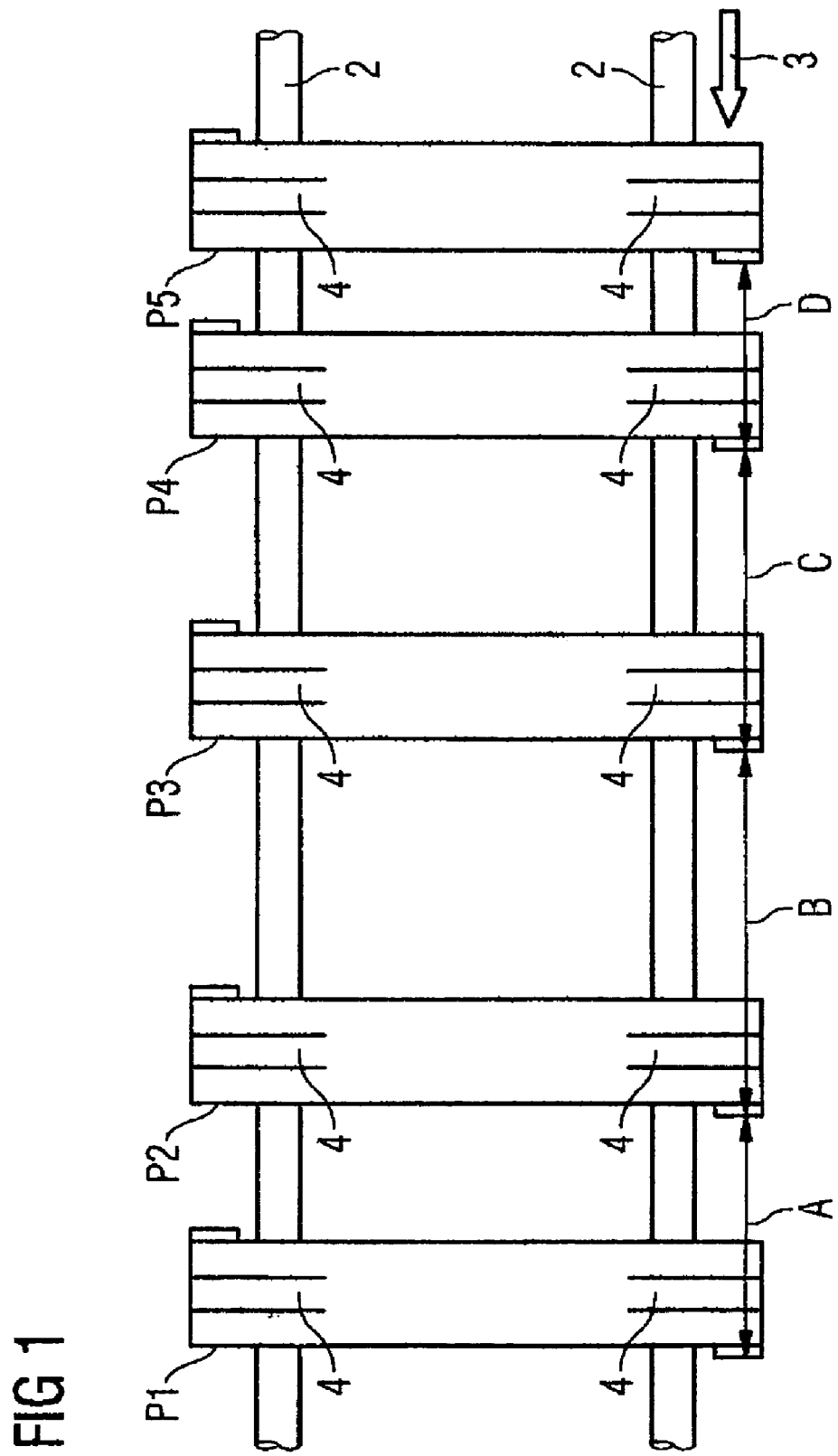
FIG. 1 shows a schematic overview of an exemplary arrangement of items movable along a path.

FIG. 1 shows a schematic overview of an exemplary arrangement of items $P_i$, i=1, 2, . . . , that are movable along a two-rail track 2, for example, of a transport system. For illustrative purposes, FIG. 1 shows five items P1, P2, P3, P4, P5 that move from the right to the left side, as indicated by an arrow 3. However, it is contemplated that the number of items $P_i$ may be variable depending on a particular application. The items P1-P5 have an elongated shape and extend across the two rails of the track 2. In one embodiment, each item P1-P5 has in an area proximate to a rail a guide section 4, as discussed below. That is, each item P1-P2 has in the illustrated embodiment a pair of guide sections 4. In that embodiment, the guide sections 4 are on one side of the items P1-P5. However, it is contemplated that the guide sections 4 may be located at other places (e.g., at corners or front sides) of the items P1-P5. The location of the guide sections 4 is selected to avoid any obstruction of the proper movement of the items P1-P5.

The items P1-P5 are in one embodiment randomly spaced at pitches A, B, C and D. That is, the pitch between item P1 and item P2 is A, the pitch between item P2 and item P3 is B, the pitch between item P3 and item P4 is C, and the pitch between item P4 and item P5 is D. The pitches A, B, C and D may be determined by the time an item P1-P5 arrives at a processing station.

Figure 2:
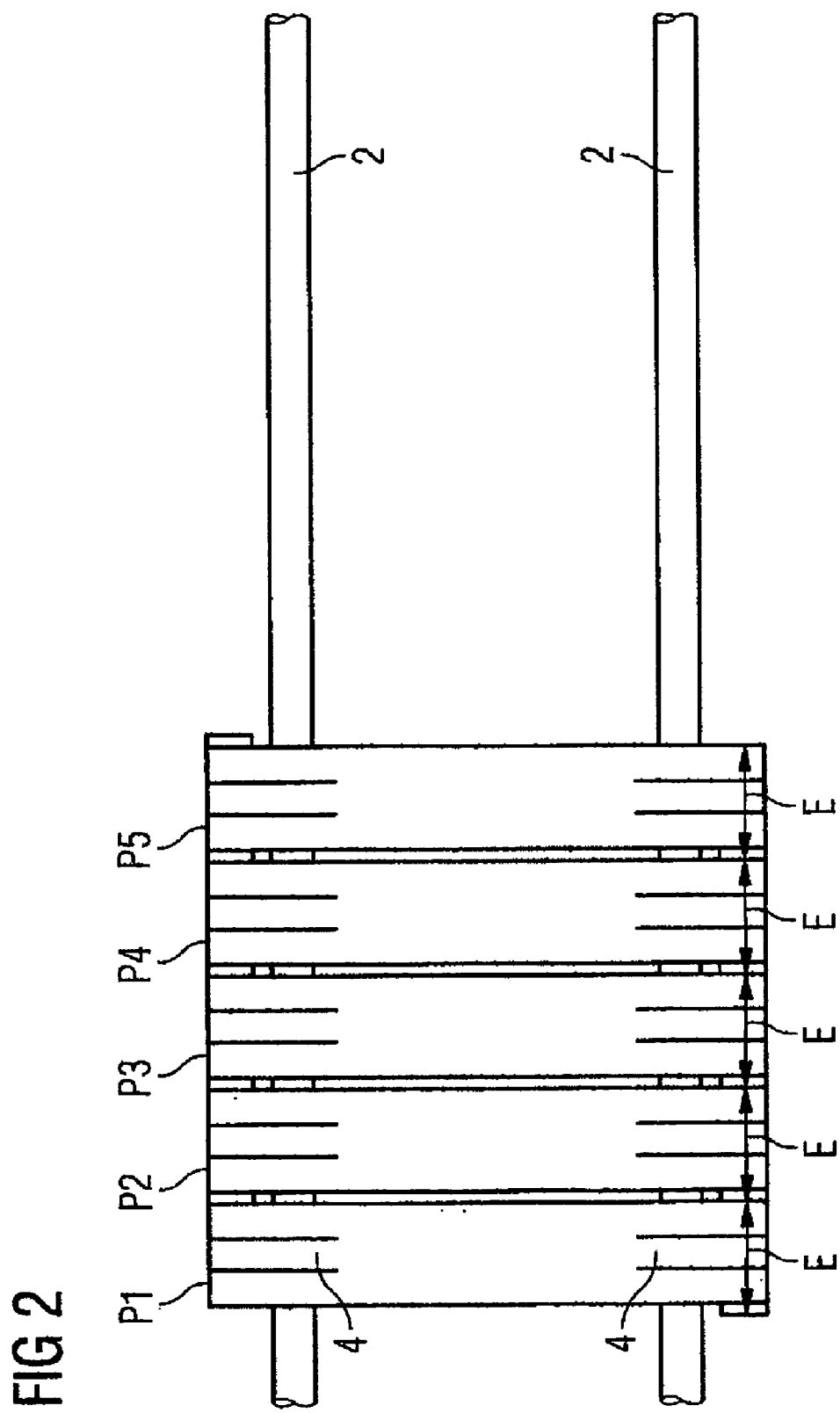
FIG. 2 illustrates the arrangement of FIG. 1 in an initial position.

FIG. 2 illustrates the arrangement of FIG. 1 in an initial position. In this initial position, the distances between the items P1-P5 have been minimized by moving, for example, pushing the items P1-P5 together. In the illustrated embodiment, a distance exists between two neighboring items P1-P5. For an exemplary application, the distance may be substantially zero. As depicted, E is the minimum possible pitch.

Figure 3:
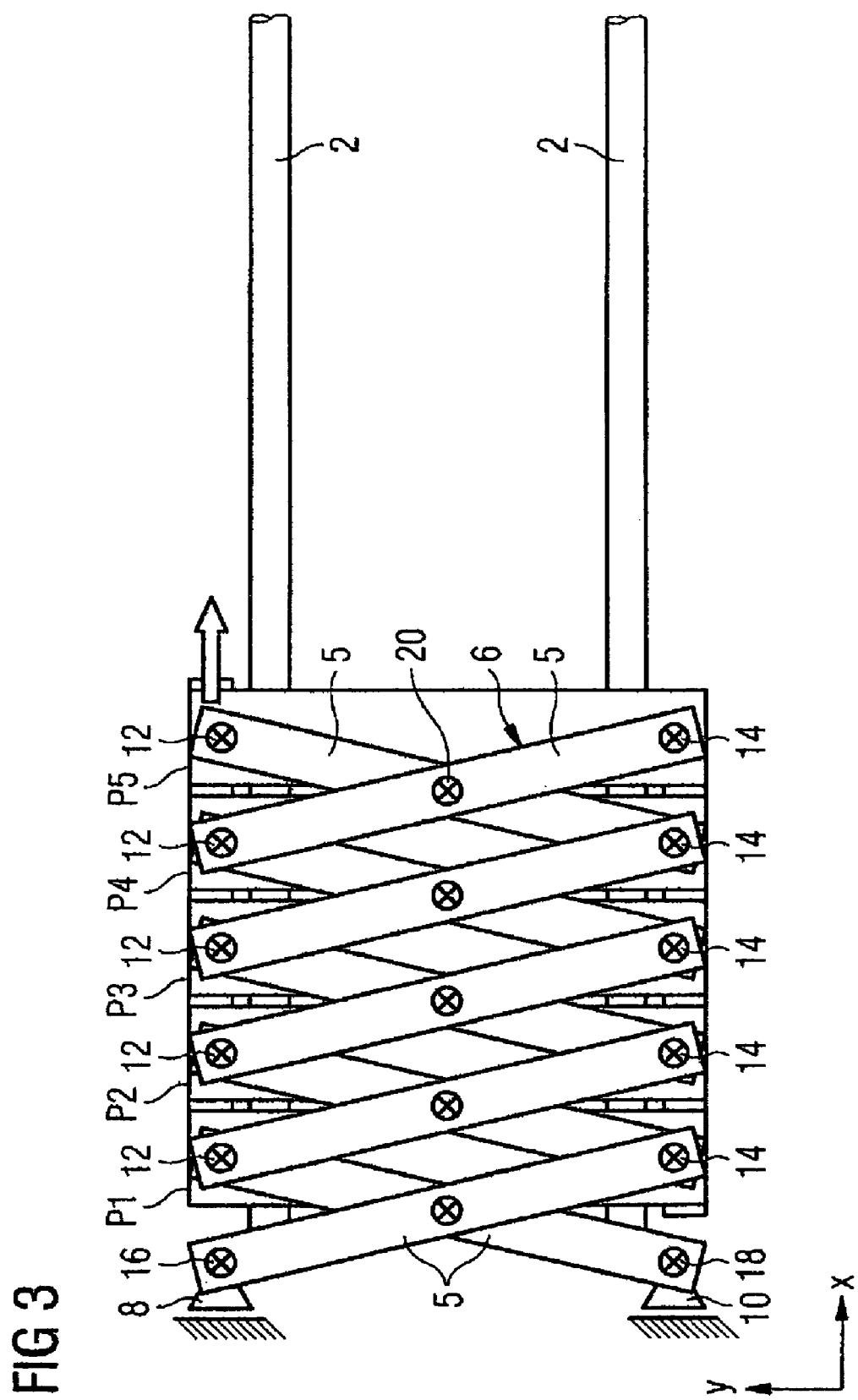
FIG. 3 illustrates one embodiment of a gear mechanism coupled to the arrangement in the initial position according to a first embodiment.

FIG. 3 illustrates one embodiment of a gear mechanism 6 coupled to the arrangement in the initial position of FIG. 2. The gear mechanism 6 includes a predetermined number of crossed bars 5, wherein pairs of the bars 5 are coupled at middle joints 20 so that each pair of bars 5 forms an X-shaped structure and is movable similar to a scissors. Opposite ends of an X-shaped structure are coupled to respective ends of neighboring X-shaped structures by means of joints 12, 14. The joints 12, 14 are configured to removably engage with the guide sections 4 of the items P1-P5 so that the joints 12, 14 may slide within the guide sections 4. The joints 12, 14, 20 are configured to permit swiveling of the bars 5. In the illustrated embodiment, the gear mechanism 6 includes five X-shaped structures that are coupled through the joints 12, 14 so that an XXXXX-structure results.

The bars 5 are made of a material that provides sufficient rigidity and resists bending. The material may be metal or reinforced plastic. Further, the bars 5 may be flat bars or profiled bars that provide for the desired properties as to rigidity and bending.

At a driving end (left hand side of FIG. 3), the bars 5 of an X-shaped structure are on one side coupled to a drive mechanism 8, 10 by means of joints 16, 18 and on the other side to a neighboring X-shaped structure by means of the joints 12, 14. The drive mechanism 8, 10 is configured to move one or both joints 16, 18 in the Y direction of a Cartesian (X-Y) coordinate system. In one embodiment, the drive mechanism 8, 10 does not move in the X direction and may be fixed at the driving end at or in proximity to the processing stations. The movement in the Y direction causes the joints 20 to move on a line parallel to the X axis so that the coupled X-shaped structures spread. The function of the gear mechanism 6 is similar to the function of Nuremberg scissors.

Figure 4:
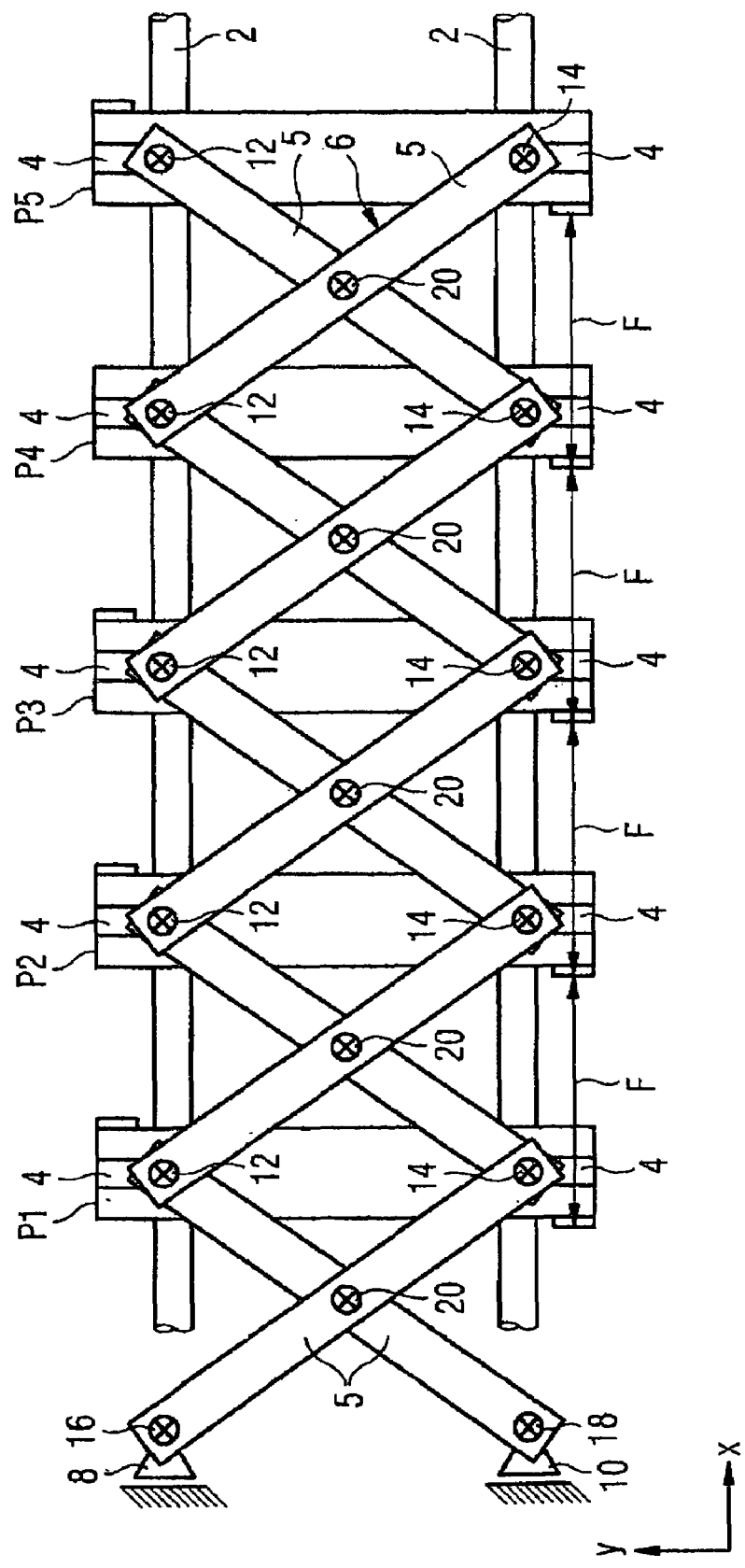
FIG. 4 illustrates the gear mechanism in an extended state according to the first embodiment.

FIG. 4 illustrates the embodiment of the gear mechanism 6 in an extended state, i.e., after the X-shaped structures have spread. While the joints 20 move in the X direction, the joints 12, 14 move in X and Y directions. The joints 12, 14 are configured to slide in the guide sections 4 and cause the items P1-P5 to move in the X direction, as well. Each item P1-P5 has an equal distance F to a neighboring item P1-P5.

Figure 5:
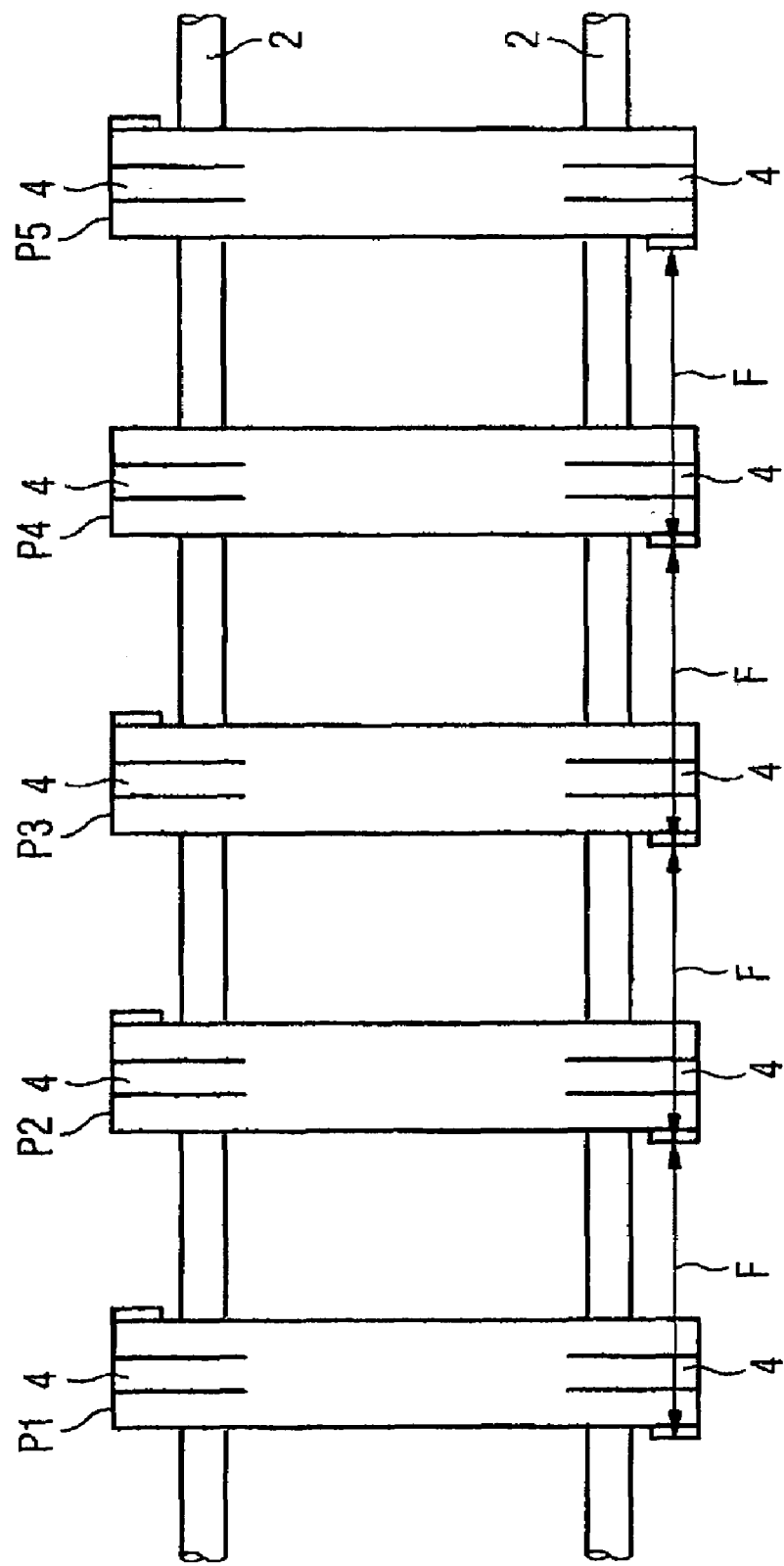
FIG. 5 illustrates the arrangement of FIG. 1 in a final position with equally spaced items.

FIG. 5 illustrates the arrangement of FIG. 1 in a final position with equally spaced items P1-P5. The gear mechanism 6 has been removed from the items P1-P5.

Figure 6:
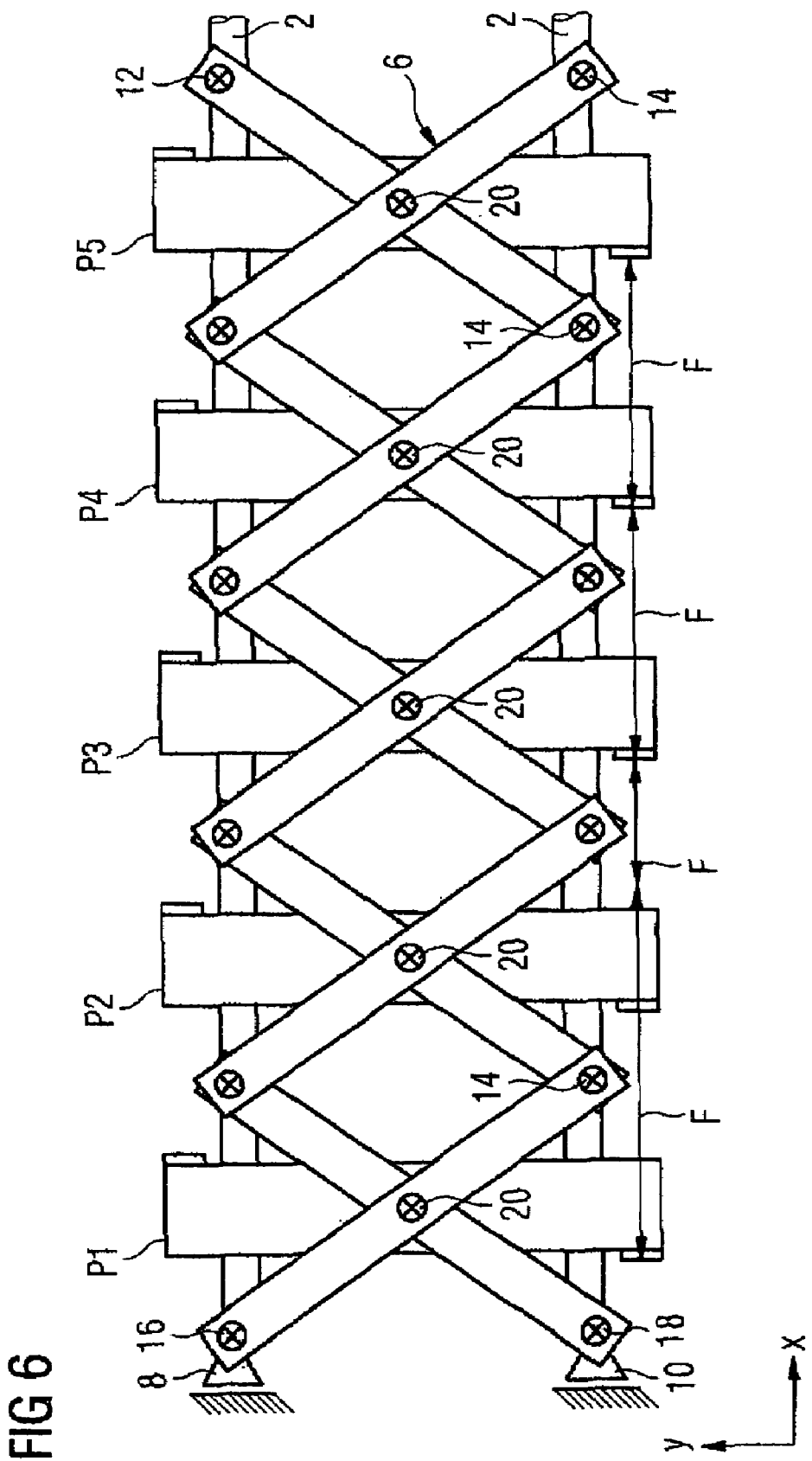
FIG. 6 illustrates the gear mechanism in an extended state according to a second embodiment.

FIG. 6 illustrates the gear mechanism 6 in an extended state according to a second embodiment. Although the gear mechanism 6 operates substantially as described with reference to FIGS. 1-5, the middle joints 20 are removably coupled to the items P1-P5 instead of the joints 12, 14. In that embodiment, the items P1-P5 may not have guide sections 4. Further, as the middle joints 20 ideally move along an axis parallel to the X axis, the middle joints 20 are configured to allow rotation but essentially no movement in Y direction.

The method of placing items, as described with reference to FIGS. 1-6, may be used in a mail processing system, which is one example of an article handling system. Such a system may process articles for delivery to millions of individual domestic addresses. Articles may include mail items, magazines, books and other items usually transported by the USPS. A mail processing system at a USPS processing site sorts all articles for the carriers and packages the sorted articles for each domestic address. The mail processing system is highly automated to handle the amount of daily articles. It includes a delivery point packaging (DPP) system that, for example, separates the articles, reads their destination addresses and groups the articles based upon their respective destination addresses. One example of a DPP system includes an arrangement of a multitude of individual pockets or slots for individual articles. A transport system transports the articles along a track system to the slots. Feeders insert the articles into the transport system at loading points. At this point, the destination address of an article is known and the transport system transports the article along a delivery path to a slot that is pre-assigned to the destination address of that article.

During the replenishment process of the sorting pockets with bags, the partitions (items) should be spaced equally before being lowered in the replenishment device. Therefore, all partitions that are to be replenished are pushed together so that the distance between the partitions is minimized, as illustrated in FIG. 2. The gear mechanism 6 is coupled to each partition, as illustrated in FIG. 3. The gear mechanism 6 is then expanded according to the desired distance between the replenishment devices. After the expansion, the partitions have the same spacing as the bags in which the partitions will be lowered.

It is apparent that there has been disclosed a system and method for equally spacing translatable items within article handling systems that fully satisfy the objects, means, and advantages set forth hereinbefore. While specific embodiments of the system and method have been described, it is evident that many alternatives, modifications, and variations will be apparent to those skilled in the art in light of the foregoing description.

I claim:

1. A method of equally spacing a predetermined number of items along a first path, comprising:
   moving the items towards each other along the first path to minimize distances between the items;
   engaging a gear mechanism with each item, the gear mechanism comprising crossed bars, wherein pairs of the bars are coupled at middle joints so that each pair of bars forms an X-shaped structure and opposite ends of an X-shaped structure are coupled at end joints to respective ends of neighboring X-shaped structures; and
   activating the gear mechanism via a drive mechanism coupled to the gear mechanism so that the gear mechanism acts upon each item and moves each item along the first path a predetermined distance to equally space the items, wherein activating the gear mechanism includes moving the end pieces at a driving side of the gear mechanism towards each other, wherein the end pieces move along a second path that is substantially perpendicular to the first path.

2. The method of claim 1, further comprising disengaging the gear mechanism from each item.

3. The method of claim 1, wherein activating the gear mechanism causes the gear mechanism to expand in direction of the first path.

4. The method of claim 1, wherein engaging the gear mechanism comprises removably coupling each item to a middle joint.

5. The method of claim 1, wherein the gear mechanism is a Nuremberg scissors.

6. A method of equally spacing a predetermined number of items along a first path, comprising:
   moving the items towards each other along the fast path to minimize distances between the items;
   engaging a gear mechanism with each item, the gear mechanism comprising crossed bars, wherein pairs of the bars are coupled at middle joints so that each pair of bars forms an X-shaped structure and opposite ends of an X-shaped structure are coupled at end joints to respective ends of neighboring X-shaped structures; and activating the gear mechanism via a drive mechanism coupled to the gear mechanism so that the gear mechanism acts upon each item and moves each item along the first path a predetermined distance to equally space the items, wherein engaging the gear mechanism comprises removably coupling each item to an end joint.

7. The method of claim 6, further comprising disengaging the gear mechanism from each item.

8. The method of claim 6, wherein activating the gear mechanism causes the gear mechanism to expand in direction of the first path.

9. The method of claim 6, wherein engaging the gear mechanism comprises removably coupling each item to a middle joint.

10. The method of claim 6, wherein the gear mechanism is a Nuremberg scissors.

* * * * *